(12) United States Patent
Takiguchi et al.

(10) Patent No.: US 6,268,566 B1
(45) Date of Patent: Jul. 31, 2001

(54) ELECTRIC WIRE HOLDER

(75) Inventors: Shuji Takiguchi; Haruyoshi Murofushi, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/208,275

(22) Filed: Dec. 9, 1998

(30) Foreign Application Priority Data

Dec. 10, 1997 (JP) .................................................... 9-339798

(51) Int. Cl.$^7$ ...................................................... H01B 3/00
(52) U.S. Cl. ........................... 174/72 A; 174/95; 248/68.1
(58) Field of Search ............................. 174/48, 49, 72 A, 174/72 C, 72 R, 96, 97, 98, 99 R; 248/49, 68.1

(56) References Cited

U.S. PATENT DOCUMENTS

| | | | |
|---|---|---|---|
| 3,391,432 | * 7/1968 | Rocher | 174/97 |
| 5,043,746 | * 8/1991 | Abe | 346/140 R |
| 5,046,464 | * 9/1991 | Hisatomi et al. | 174/72 A |
| 5,115,260 | * 5/1992 | Hayward et al. | 174/72 A |
| 5,399,812 | * 3/1995 | Woszczyna et al. | 174/97 |
| 5,463,189 | * 10/1995 | Deneke et al. | 174/72 A |
| 5,703,330 | * 12/1997 | Kujawski | 174/72 A |
| 5,811,732 | * 9/1998 | Beam | 174/72 A |

FOREIGN PATENT DOCUMENTS

| | | |
|---|---|---|
| 41 09 653 A1 | 9/1992 | (DE) . |
| 42 23 370 A1 | 1/1995 | (DE) . |

* cited by examiner

*Primary Examiner*—Dean A. Reichard
*Assistant Examiner*—Adolfo Nino
(74) *Attorney, Agent, or Firm*—Armstrong, Westerman, Hattori, McLeland & Naughton, LLP

(57) ABSTRACT

An electric wire holder for laterally arranging a plurality of electric wires on an object is provided, which includes a plurality of slit-like receiving portions each formed with a pair of wall portions facing to each other for receiving an electric wire, wherein the wall portions are heightened more than a diameter of the electric wire according to number of the electric wire to be held so as to receive the plurality of electric wires in pile in a single receiving portion. Thus, a number of electric wires can be arranged along with reduction of an arranging space, increase and decrease in number of electric wire can be easily coped with, and each electric wire can be surely and tightly held.

10 Claims, 6 Drawing Sheets

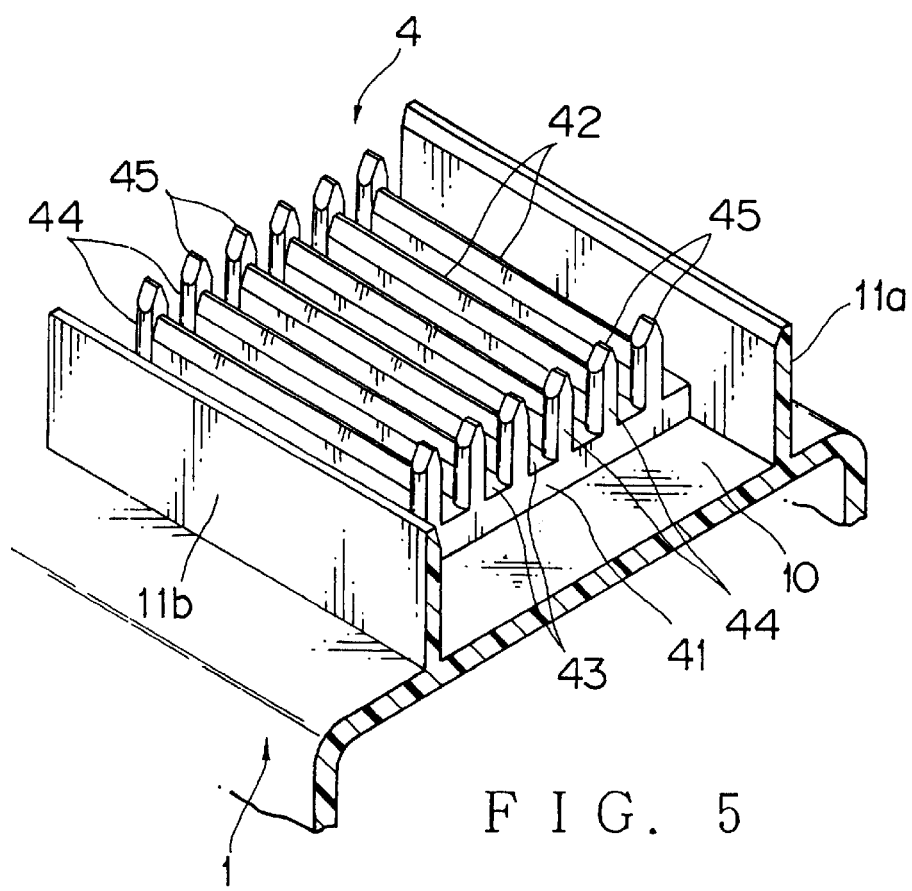
F I G. 5
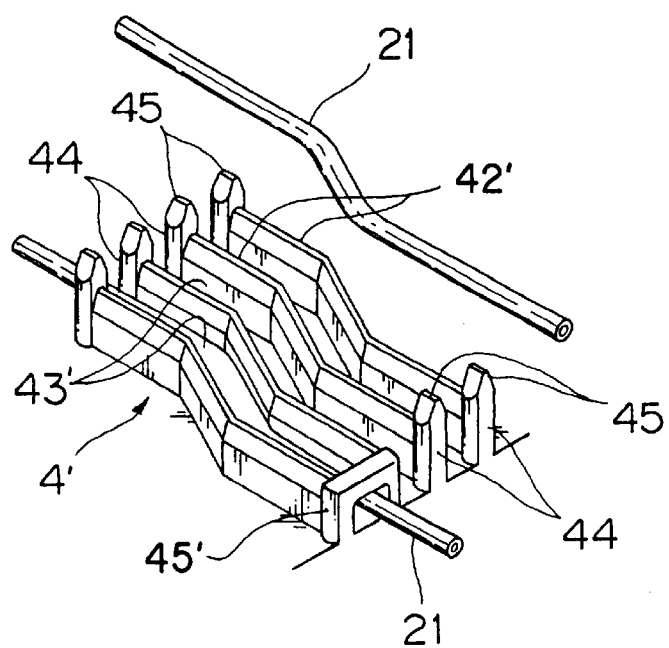
F I G. 7

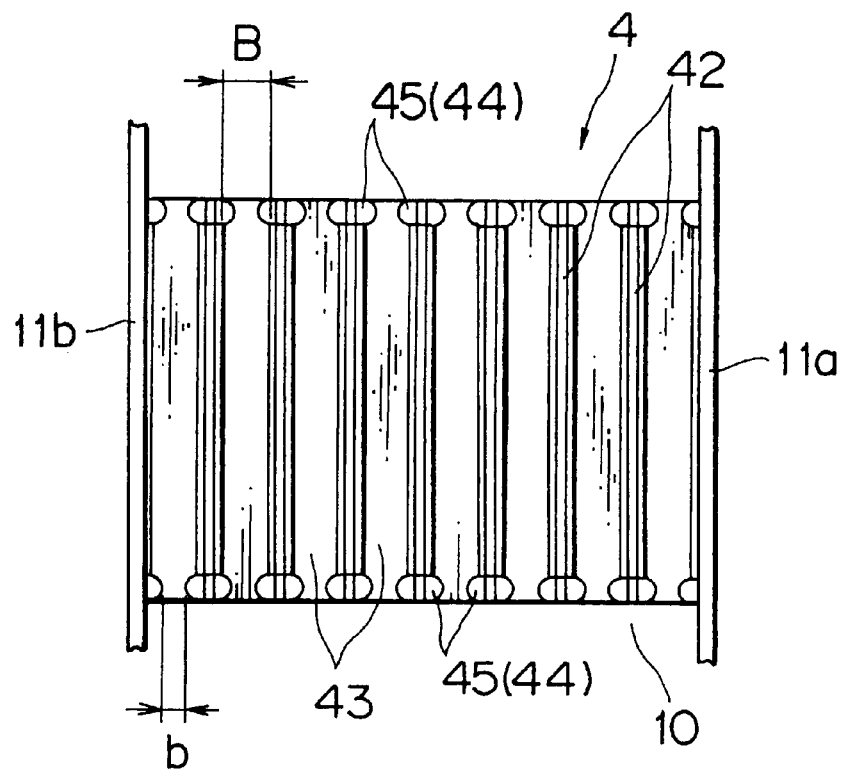
F I G. 6 A
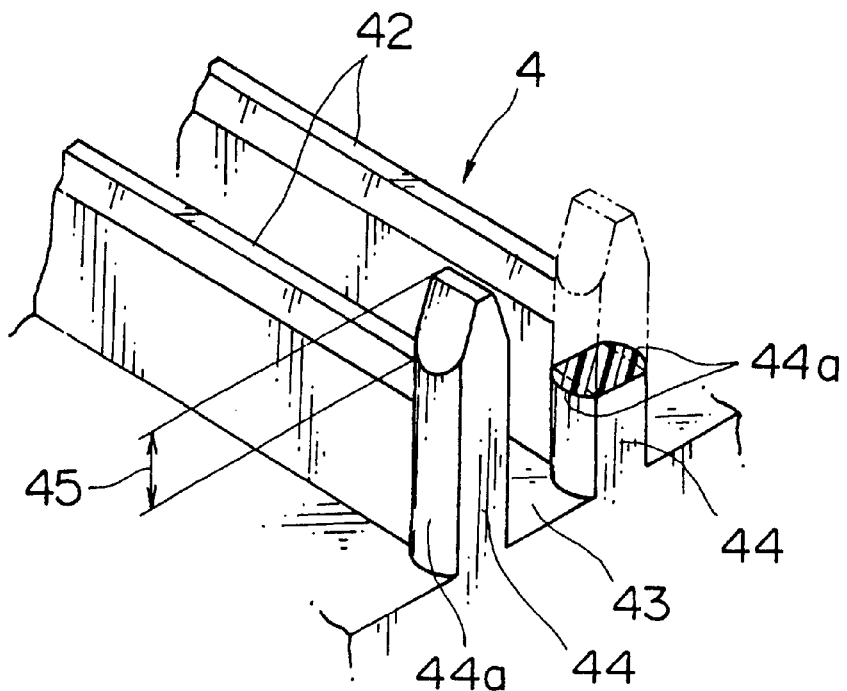
F I G. 6 B

ELECTRIC WIRE HOLDER

BACKGROUND OF THE INVENTION

1. Field of the Invention

The present invention generally relates to an electric wire holder for laterally arranging a plurality of electric wires in an air duct of a motor vehicle, for example, and more particularly, to an electric wire holder wherein a number of electric wires can be arranged along with reduction of an arranging space, increase and decrease in number of electric wire can be easily coped with, and each electric wire can be surely and tightly held.

2. Description of the Related Art

FIGS. 8 and 9 show a prior art electric wire holding means disclosed in Japanese Patent Application Laid-open No. 9-306608.

An air duct 101 of synthetic resin is arranged in an instrument panel of a motor vehicle as shown in FIG. 8, and a wiring harness 102 for electrically connecting various electric appliance units mounted the instrument panel is arranged in a peripheral wall of the air duct 101. The wiring harness 102 consists mainly of a flat arranged wire bundle 121 with several branches and connectors 122 attached to the branched ends of the flat arranged wire bundle 121.

The wiring harness 102 is arranged on the peripheral wall of the air duct 101 by such a means shown in FIG.9 conventionally.

More specifically, a plurality of electric wires 121a constituting the wiring harness 102 are adhesively connected in a flat state and a slit S is partially provided between the electric wires 121a, and, on the other hand, a wiring harness arranging groove 110 is formed along the peripheral wall of the air duct 101 and an insulating rib 111 corresponding to the slit S projects partially from the wiring harness arranging groove 110. The flat arranged wire bundle 121 is fixed with an adhesive on the wiring harness arranging groove 110, while the insulating rib 111 is inserted into the slit S.

With respect to the above prior art wiring harness arranging means, however, since width of the flat arranged wire bundle 121 becomes large in proportion to number of the electric wire 121a, thereby enlarging the arranging space, too many of the electric wires 121a could not be arranged by restriction of a space of the peripheral wall of the air duct 101 or of an interfering object like a blower unit.

And, since number of the wiring harness arranging grooves 110 to fix the flat arranged wire bundle 121 is fixed, it is difficult to cope with increase and decrease in number of electric wire according to difference between a popular motor vehicle and a luxury motor vehicle.

Further, since the adhesion of the flat arranged wire bundle 121 to the wiring harness arranging groove 110 is short of holding ability against tensile force, the flat arranged wire bundle 121 would come off the wiring harness arranging groove by strong tensile force especially near the connector.

SUMMARY OF THE INVENTION

In view of the foregoing, an object of the present invention is to provide an electric wire holder, wherein a number of electric wires can be arranged along with reduction of an arranging space, increase and decrease in number of electric wire can be easily coped with, and each electric wire can be surely and tightly held.

In order to achieve the above-described object, in accordance with a first aspect of the present invention, the electric wire holder for laterally arranging a plurality of electric wires on an object includes a plurality of slit-like receiving portions each formed with wall portions standing on a base portion and facing to each other for receiving an electric wire, wherein the wall portions are heightened more than a diameter of the electric wire according to number of the electric wire to be held so as to receive the plurality of electric wires in pile in a single receiving portion.

According to the above structure, since the receiving portion can vertically receive a plurality of electric wires, a number of electric wires can be arranged, simultaneously with reduction of an arranging space of the electric wires, and then increase and decrease in number of electric wire can be easily coped with.

In accordance with a second aspect of the present invention, the electric wire holder includes: a plurality of slit-like receiving portions each formed with wall portions standing on a base portion and facing to each other for receiving an electric wire; and a thermoplastic projecting portion provided at least on both ends of the wall portion, wherein the electric wire is held in the receiving portion by means of thermal deformation of the projecting portion.

According to the above structure, since the electric wire holder holds a plurality of the electric wires, one by one, in the slit-like receiving portions by both of pressure-contact and thermoplastic deformation, holding ability against upward and lateral tensile force can be improved and, therefore, each of the electric wires can be surely and tightly held.

In accordance with a third aspect of the present invention, the electric wire holder includes: the plurality of slit-like receiving portions each formed with the pair of wall portions facing to each other for receiving the electric wire, wherein the wall portions are heightened more than the diameter of the electric wire according to number of the electric wire to be held; and the thermoplastic projecting portion provided at least on both ends of the wall portion, wherein the electric wire is held in the receiving portion by means of thermal deformation of the projecting portion.

According to the above structure, a number of electric wires can be arranged, while reducing an arranging space of the electric wires, and increase and decrease in number of electric wire can be easily coped with. Simultaneously, each of the electric wires can be surely and tightly held.

In accordance with a fourth aspect of the present invention, the receiving portion is formed in a substantially crank-like shape by bending the wall portion in a substantially crank-like shape so as to bend the electric wire in a substantially crank-like shape for surely and tightly holding the electric wire in the receiving portion.

According to the above structure, holding ability of the electric wire for longitudinal tensile force is improved and especially, in case that the electric wire holder is provided near a connector, the electric wire can be surely held, withstanding tensile force toward the connector.

In accordance with a fifth aspect of the present invention, a space between the wall portions facing to each other is a little smaller than the diameter of the electric wire and simultaneously a circular-arc shaped concave corresponding to an external form of the electric wire is formed on the wall portion at an abutting surface against the electric wire so as to hold the electric wire within the receiving portion with keeping in pressure-contact with the concave.

According to the above structure, the electric wire can be more surely held within each of the receiving portions and besides, a plurality of electric wires can be positioned vertically in case the plurality of electric wires are received in one receiving portion.

In accordance with a sixth aspect of the present invention, the electric wire holder further includes pressure-contacting portions, each provided on the wall portions facing to each other, facing to each other with a gap a little smaller than the diameter of the electric wire so as to hold the electric wire within the receiving portion with keeping in pressure-contact with the pressure-contacting portions.

According to the above structure, since the space between the wall portions facing oppositely to each other is larger than the diameter of the electric wire, the electric wire can be easily received in the receiving portion, while being surely held by the pressure-contacting portions.

In accordance with a seventh aspect of the present invention, the electric wire holder is formed integrally with or separately from a wiring harness arranging path provided on the object thereby to hold a wiring harness on the wiring harness arranging path.

As described hereinabove, according to the electric wire holder of the present invention, a number of electric wires can be arranged along with reduction of an arranging space, increase and decrease in number of electric wire can be easily coped with, and each electric wire can be surely and tightly held.

The above and other objects and features of the present invention will become more apparent from the following description taken in conjunction with the accompanying drawings.

BRIEF DESCRIPTION OF THE DRAWINGS

FIG. 5 is a perspective view showing a second embodiment of an electric wire holder in accordance with the present invention;

FIG. 6A is a plan view showing the electric wire holder of FIG. 5;

FIG. 6B is an enlarged perspective view of a main portion of the electric wire holder of FIG. 6A;

FIG. 7 is a perspective view showing a modified embodiment of the electric wire holder of the second embodiment;

DESCRIPTION OF THE PREFERRED EMBODIMENTS

Embodiments of the present invention will now be described in further detail with reference to the accompanying drawing.

Figure 1:
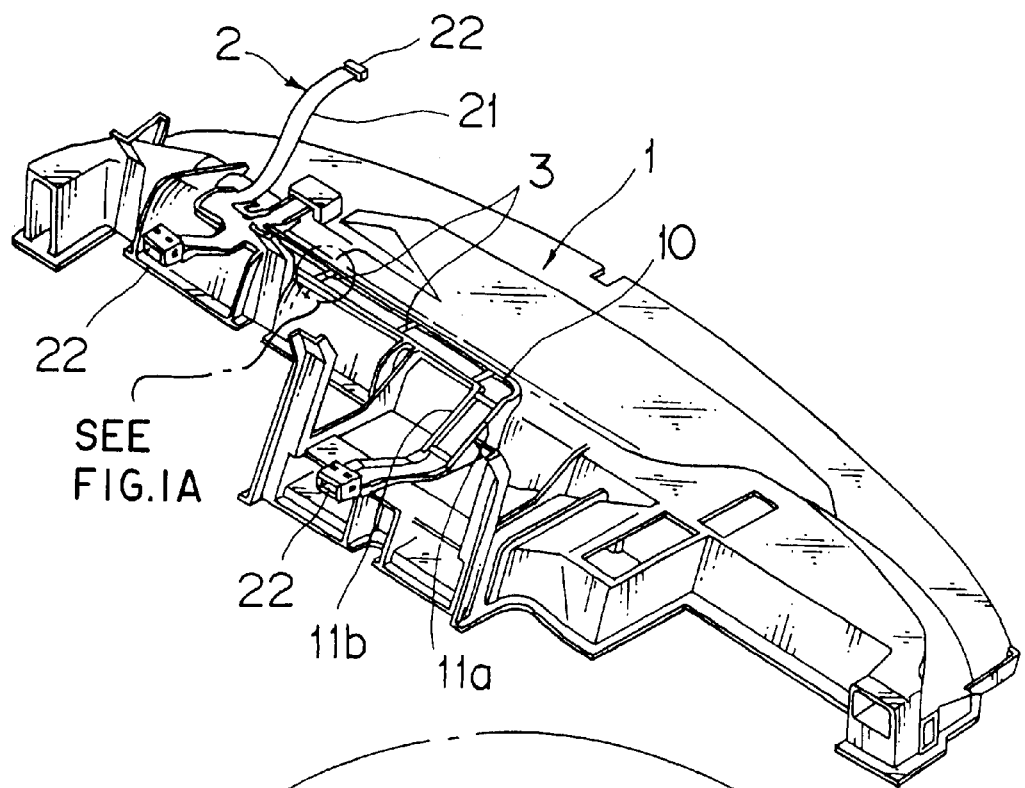
FIG. 1 is a perspective view showing a first embodiment of an electric wire holder in accordance with the present invention and also showing an air duct provided with the electric wire holder.

FIG. 1 shows a first embodiment of an electric wire holder in accordance with the present invention and an air duct being provided with the electric wire holder.

Referring to FIG. 1, the air duct 1 is an object, on which a wiring harness 2 is arranged, and is mounted on an instrument panel being not shown. The air duct 1 is provided with a wiring harness arranging path 10 corresponding to a branch of the wiring harness 2. The wiring harness arranging path 10 is formed with a pair of side walls 11a,11b integrally formed with the air duct 1 made of synthetic resin.

The wiring harness arranging path 10 is provided with electric wire holders 3 at several points thereon as shown in FIG. 1.

Figure 1A:
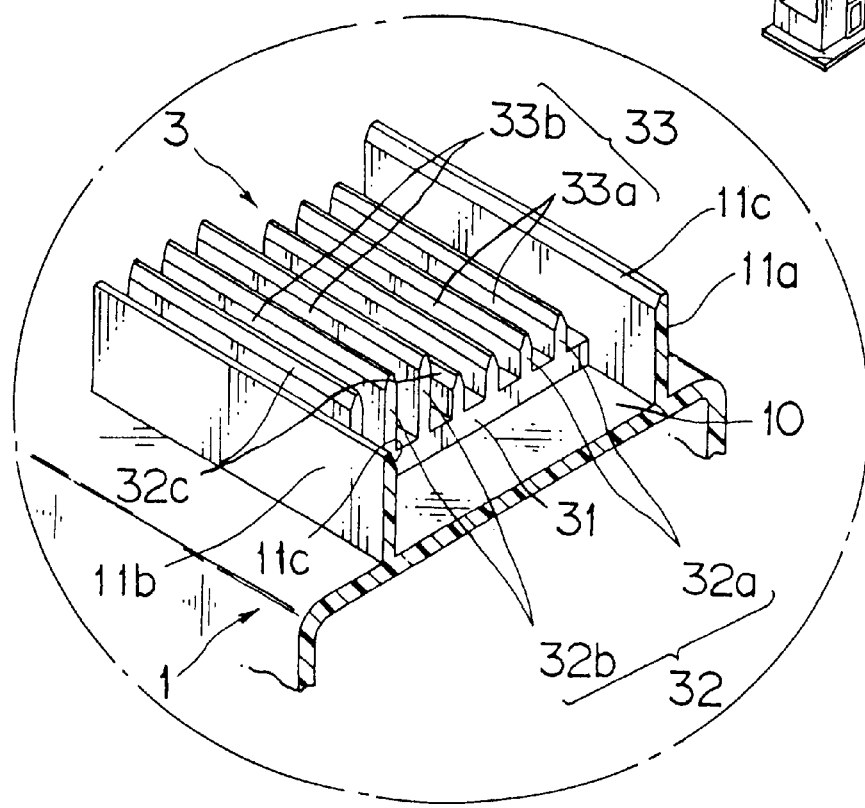
FIG. 1A is a perspective detail view showing the electric wire holder within the dashed circle of FIG. 1.

As shown in FIG. 1A, a plurality of wall portions 32 stand in parallel on a base portion 31, and the electric wire holder 3 laterally arranges and simultaneously holds a plurality of electric wires 21, one by one, constituting the wiring harness 2.

Figure 2A:
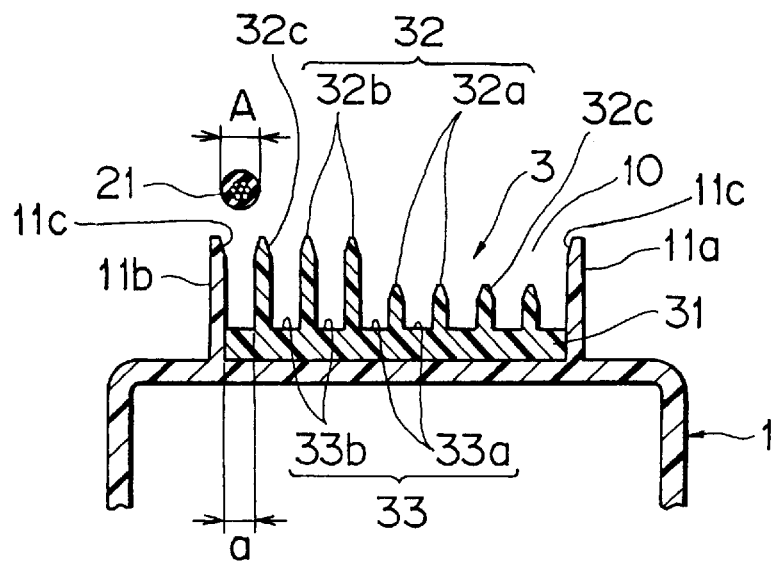
FIG. 2A is a sectional view showing the electric wire holder of FIG. 1.

As shown FIG. 2A, each of the wall portions 32 faces oppositely to each other with a space a little smaller than a diameter A of the electric wire 21, thereby forming a plurality of slit-like receiving portions 33.

Wall portions 32a of the plurality of the wall portions 32 have almost the same height with the diameter A of the electric wire 21, and wall portions 32b, namely the other part of the wall portions 32 than wall portions 32a, have height of approximately twice the diameter A of the electric wire 21.

Therefore, a receiving portion 33a including at least one wall portion 32a can receive only one electric wire 21, and a receiving portion 33b formed with a pair of wall portions 32b,32b can receive two electric wires 21 vertically.

And, side walls 11a,11b forming the wiring harness arranging path 10 have height of twice the diameter A of the electric wire 21 and form the respective receiving portions 33a,33b along with the respective wall portions 32a,32b located on both sides of the electric wire holder 3.

Further, guide inclined-planes 11c,32c to guide the electric wire 21 into the receiving portion 33 are formed at each end of the side walls 11a,11b and of the wall portions 32a,32b.

The electric wire holder 3 may be formed integrally with the air duct 1 of synthetic resin, or may be formed separately from the air duct 1 and be fixed thereto by adhesion and the like.

Figure 2B:
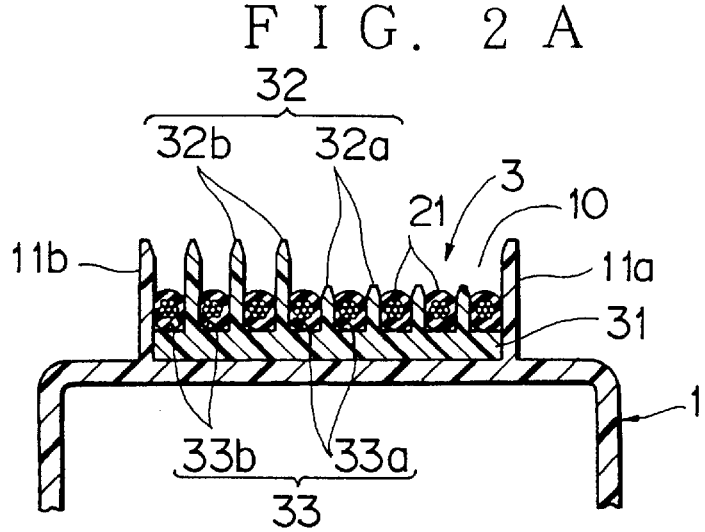
FIGS. 2B and 2C are sectional views showing the electric wire holder of FIG. 1 in use.
Figure 2C:
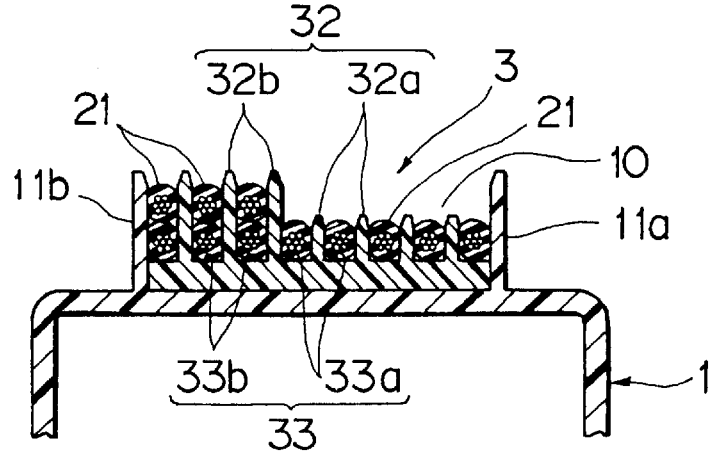

Next, an action of the electric wire holder 3 is described, referring to FIGS. 2B and 2C.

The wiring harness 2 is arranged into the wiring harness arranging path 10 by an automatic wiring device.

For example, since a popular motor vehicle does not require the wiring harness 2 with a number of the electric wire 21, the electric wire 21 is singly pressure-inserted into the receiving portions 33a,33b and provisionally held therein when the wiring harness 2 is arranged on the wring harness arranging path 10, as shown in FIG. 2B.

On the other hand, since a luxury, i.e. high grade, motor vehicle requires the wiring harness 2 with a number of the electric wire 21 compared to the popular motor vehicle, the electric wire 21 is singly pressure-inserted into the receiving portions 33a, doubly pressure-inserted vertically into each of the receiving portions 33b, and provisionally held therein, as shown in FIG. 2C.

Subsequently, the electric wire 21 is finally fixed tightly by means of partly melting the side walls 11a,11b and the wall portions 32a,32b, of adhesion by an adhesive, or of a covering member being not shown.

Figure 3:
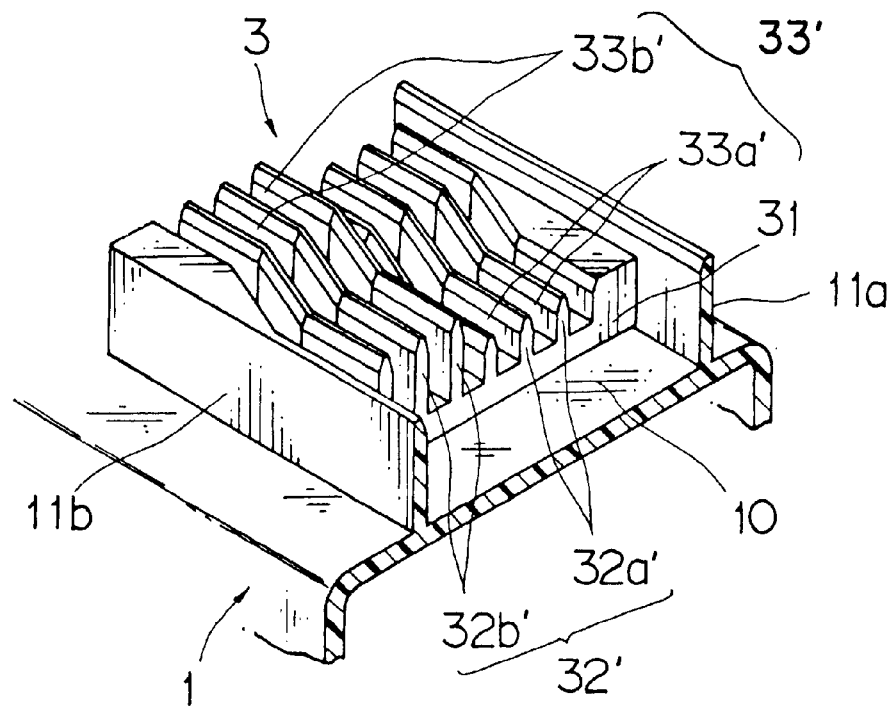
FIG. 3 is a perspective view showing a modified embodiment of the electric wire holder of the first embodiment.

According to the present embodiment of an electric wire holder, as described hereinabove, since the receiving portion 33b can vertically receive a pair of electric wires 21, a number of electric wires 21 can be arranged on the air duct 1, simultaneously with reduction of an arranging space of the electric wires 21, and then increase and decrease in number of electric wire can be easily coped with. Here, though the receiving portions 33a,33b of the above embodiment are straight slit-like, the receiving portions 33a,33b may be substantially crank-like by bending the wall portions 32a,32b in a substantially crank-like shape as shown in FIG. 3.

With this structure, the electric wire 21 received in each of the receiving portions 33a,33b is held in a substantially crank-like shape, holding ability of the. electric wire 21 for longitudinal tensile force is improved.

Especially, in case that the electric wire holder 3 is provided near a connector 22, the electric wire 21 can be surely held, withstanding tensile force toward the connector 22.

Figure 4:
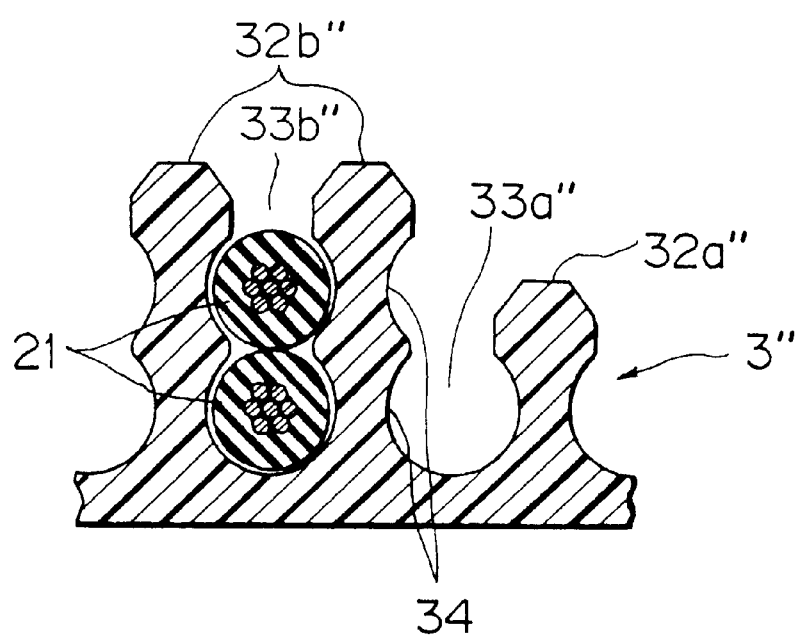
FIG. 4 is a sectional view showing a modified embodiment of the electric wire holder of the first embodiment.
Figure 8:
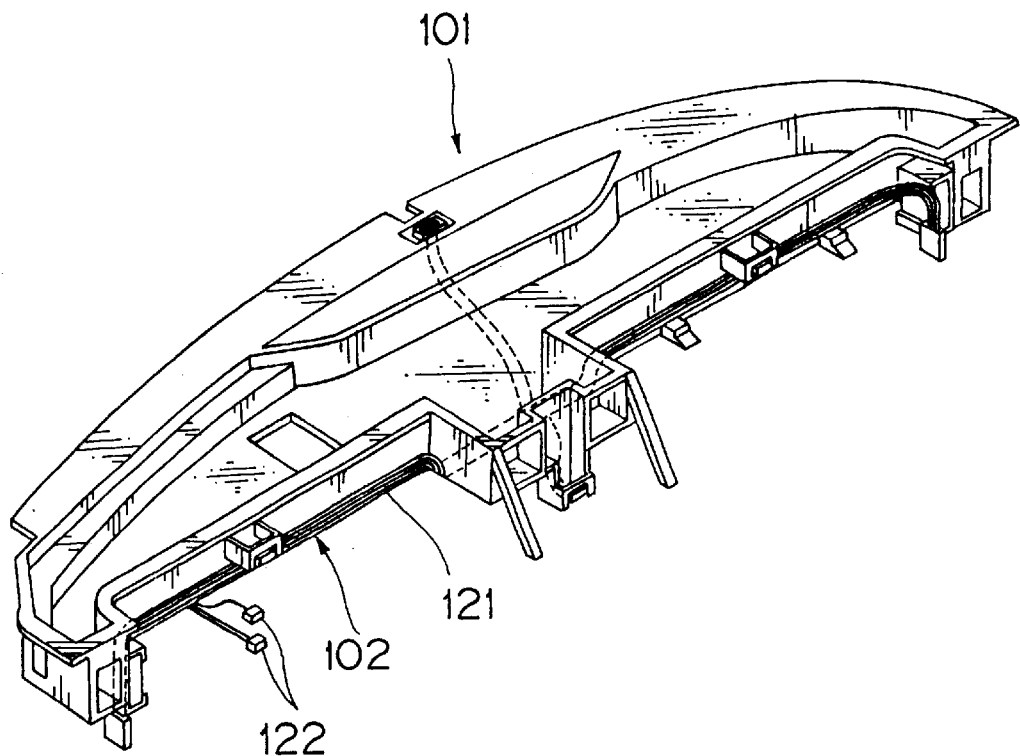
FIG. 8 is a perspective view showing an air duct provided with a prior art electric wire holding means.
Figure 9:
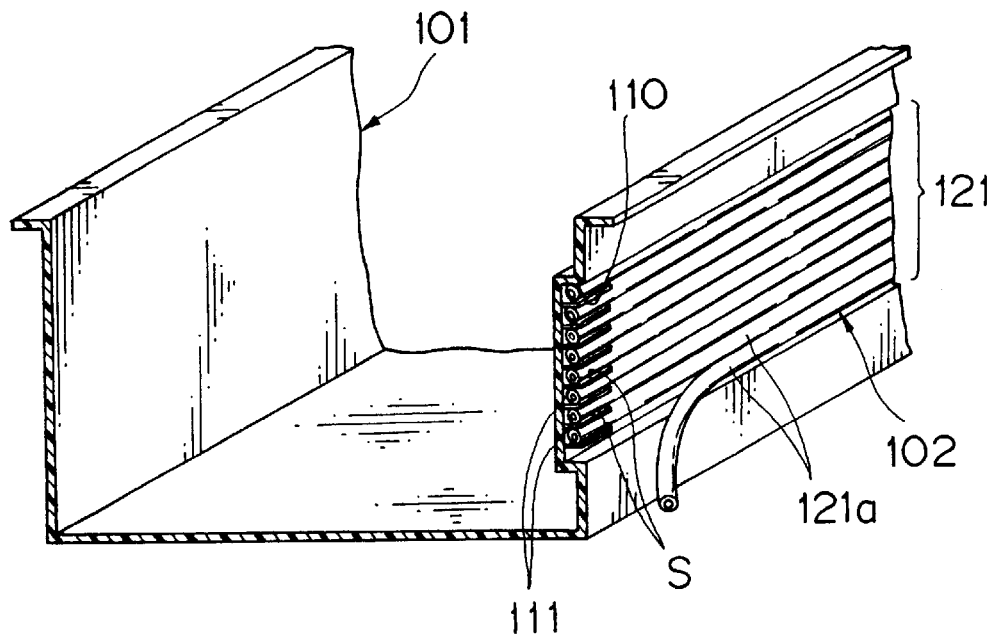
FIG. 9 is an enlarged perspective view showing the prior art electric wire holding means.

Further, from viewpoint of improving holding ability for the electric wire 21, as shown in FIG. 4, a circular-arc shaped concave 34 corresponding to an external form of the electric wire 21 may be formed on each of the wall portions 32a,32b at an abutting surface against the electric wire 21, and the electric wire 21 may be held within each of the receiving portions 33a,33b with keeping in pressure-contact with the concave 34.

According to the above-described structure, the electric wire 21 can be more surely held within each of the receiving portions 33a,33b, and besides, a pair of electric wires 21 can be positioned vertically in case the pair of electric wires 21 are received in one receiving portion 33b.

FIGS. 5 and 6 show a second embodiment of an electric wire holder in accordance with the present invention.

Similarly to the first embodiment, the electric wire holder in accordance with the present embodiment is for the use of laterally arranging a plurality of electric wires on the wiring harness arranging path of the air duct and, however, can more surely hold the electric wires.

Referring to FIGS. 5 and 6A, an electric wire holder 4 of the present embodiment has a plurality of wall portions 42 standing in parallel on a base portion 41.

Each of wall portions 32 faces oppositely to each other with a space B being a little larger than the diameter A of the electric wire 21 (shown in to FIG. 2), thereby forming a slit-like receiving portion 33. And, all of the wall portions 42 have almost the same height as the diameter of the electric wire 21.

As shown in FIG. 6B, a pressure-contacting portion 44 with a semicircular pressure contacting surface 44a is integrally provided on both ends of the wall portion 42. A gap b between the pressure-contacting surfaces 44a of the pressure-contacting portions 44 faceing each other is a little smaller than the diameter A of the electric wire 21 so as to hold the electric wire 21 received in the receiving portion 43 by two (2) points by the pressure-contacting surfaces 44a Besides, a thermoplastic projecting portion 45 projecting from the wall portion 42 is formed integrally with the pressure-contacting portion 44 on the top thereof so as to hold the two (2) points of the electric wire 21 received in the receiving portion 43 by means of thermoplastic deformation of the projecting portion 45.

Since the electric wire holder 4 of the present embodiment holds a plurality of the electric wires 21, one by one, in the slit-like receiving portions 43 by both of pressure-contact and thermoplastic deformation, holding ability against upward and lateral tensile force can be improved and, therefore, each of the electric wires 21 can be surely and tightly held.

And, since the space B between the wall portions 42 facing oppositely to each other is larger than the diameter A of the electric wire 21, the electric wire 21 can be easily received in the receiving portion 43, while being surely held as described above.

Further, as shown in FIG. 7, the electric wire holder 4 of the present embodiment may be provided with the wall portion 42 in a substantially crank-like shape so as to form the receiving portion 43 in a substantially crank-like shape, similarly with the first embodiment.

According to the above-described structure, holding ability for the electric wire 21 against longitudinal tensile force in addition to upward and lateral tensile force can be improved, that is, the electric wire 21 can be surely held against tensile force in all directions.

Still further, similarly to the first embodiment, the wall portion 42 may be higher than the diameter A of the electric wire 21 correspondingly to number of the electric wire 21 to be held so as to receive a plurality of electric wires 21 vertically in the receiving portion 43.

According to the above-described structure, a number of electric wires 21 can be arranged in a small arranging space, while being surely held as described above, which, accordingly, enables to easily cope with increase and decrease in number of electric wire.

Although the present invention has been fully described by way of examples with reference to the accompanying drawing, it is to be noted that various changes and modifications will be apparent to those skilled in the art. Therefore, unless otherwise such changes and modifications depart from the scope of the present invention, they should be construed as being included therein.

What is claimed is:

1. An electric wire holder for laterally arranging a plurality of electric wires on an object, comprising:

a plurality of slot-like receiving portions each formed with wall portions upstanding from a base portion and facing each other for receiving an electric wire; and a thermoplastic rod-like projecting portion provided at least on both longitudinal ends of each of the wall portions in a height direction thereof, wherein each electric wire is held in a slot-like receiving portion by means of a thermally-deformed portion of the rod-like projecting portion.

2. The electric wire holder according to claim 1, wherein each slot-like receiving portion is formed in a substantially staggered shape by bending the wall portions in a substantially zig-zag shape so as to bend an electric wire in a substantially zig-zag shape for surely and tightly holding an electric wire in each slot-like receiving portion.

3. The electric wire holder according to claim 2, wherein a space between the wall portions facing each other is a little smaller than a diameter of an electric wire installed in said space and simultaneously a recess of circular-arc shape corresponding to an external form of the electric wire is formed on the wall portions at an abutting surface against the electric wire so as to hold the electric wire by pressure in the recess within each slot-like receiving portion.

4. The electric wire holder according to claim 2, further comprising vertically-elongated pressure-contacting portions, each located at opposite ends of the wall portions, the vertically-elongated pressure containing portions that face each other defining a gap a little smaller than a diameter of the electric wire so as to hold the electric wire within each slot-like receiving portion by pressure-contact with the pressure-contacting portions.

5. The electric wire holder according to claim 1, wherein a space between the wall portions facing each other is a little smaller than a diameter of an electric wire installed in said space and simultaneously a recess of circular-arc shape corresponding to an external form of the electric wire is formed on the wall portions at an abutting surface against the electric wire so as to hold the electric wire by pressure in the recess within each slot-like receiving portion.

6. The electric wire holder according to claim 1, further comprising vertically-elongated pressure-contacting portions, each located at opposite ends of the wall portions, the vertically-elongated pressure-contacting portions that face each other defining a gap a little smaller than a diameter of the electric wire so as to hold the electric wire within each slot-like receiving portion by pressure-contact with the pressure-contacting portions.

7. The electric wire holder according to claim 1, wherein the electric wire holder is formed integrally with, or separately from, a wiring harness arranging path provided on the object thereby to hold a wiring harness on the wiring harness arranging path.

8. An electric wire holder for laterally arranging a plurality of electric wires on an object, comprising:

a plurality of slot-like receiving portions each formed with wall portions upstanding from a base portion and facing each other for receiving an electric wire, wherein each slot-like receiving portion is formed in a substantially staggered shape by bending the wall portions in a substantially zig-zag shape so as to bend an electric wire in a substantially zig-zag shape for surely and tightly holding an electric wire in each slot-like receiving portion, and the wall portions being higher than the sum of the diameters of a plurality of electric wires stacked in each of the slot-like receiving portions, and further comprising a thermoplastic rod-like projecting portion provided at least on both longitudinal ends of the wall portions, wherein an electric wire is held in the slot-like receiving portion by means of a thermally deformed portion of the rod-like projecting portion.

9. The electric wire holder according to claim 8, wherein a space between the wall portions facing each other is a little smaller than a diameter of an electric wire installed in said space and simultaneously a recess of circular-arc shape corresponding to an external form of the electric wire is formed on the wall portions at an abutting surface against the electric wire so as to hold the electric wire by pressure in the recess within each slot-like receiving portion.

10. The electric wire holder according to claim 8, further comprising vertically-elongated pressure-contacting portions, each located at opposite ends of the wall portions, the vertically-elongated pressure contacting portions that face each other defining a gap a little smaller than a diameter of the electric wire so as to hold the electric wire within each slot-like receiving portion by pressure-contact with the pressure-contacting portions.

* * * * *